R. LYNEX.
Animal-Trap.
No. 215,140. Patented May 6, 1879.
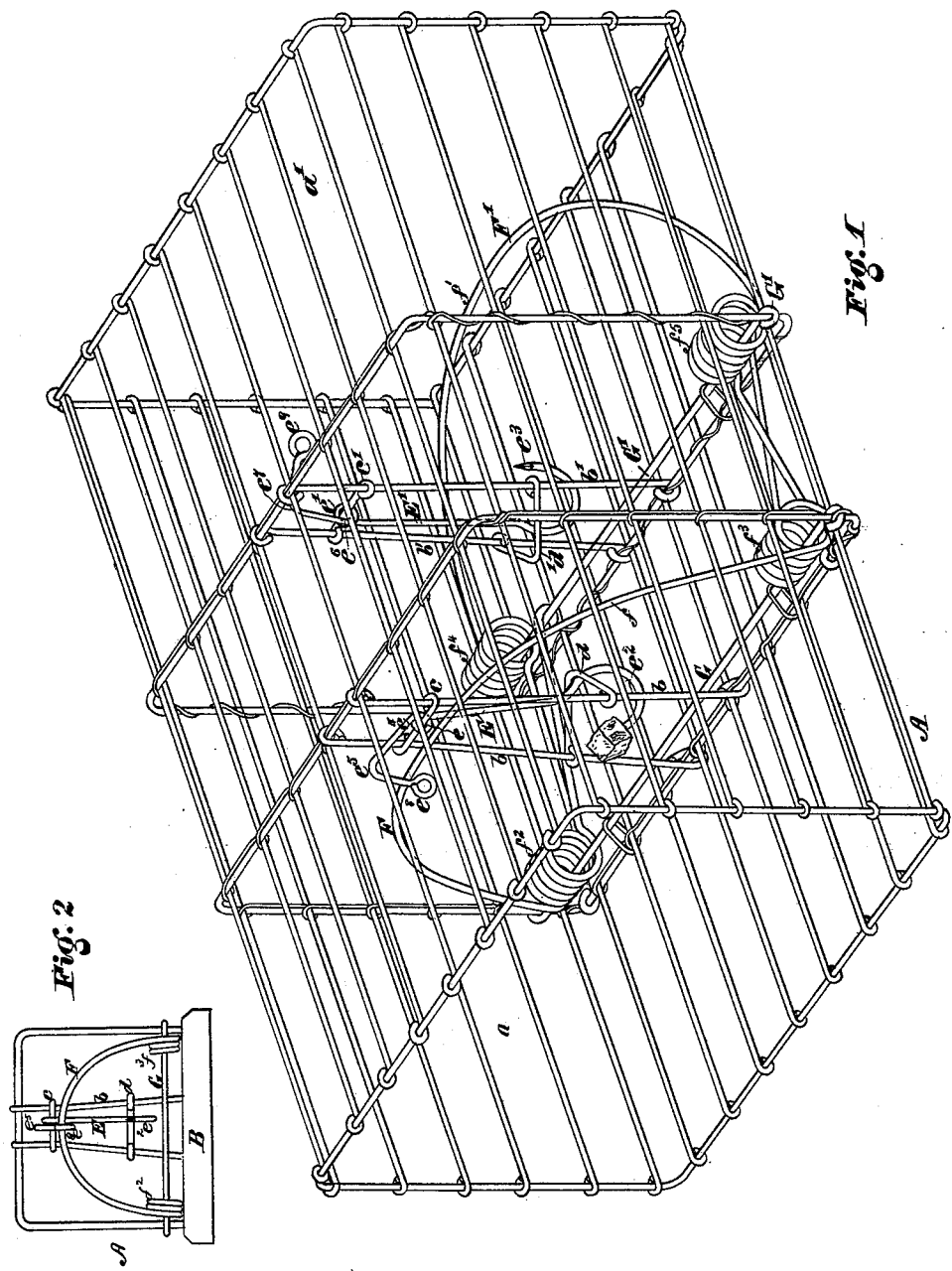

UNITED STATES PATENT OFFICE.

RICHARD LYNEX, OF PHILADELPHIA, PENNSYLVANIA.

IMPROVEMENT IN ANIMAL-TRAPS.

Specification forming part of Letters Patent No. 215,140, dated May 6, 1879; application filed January 21, 1879.

*To all whom it may concern:*

Be it known that I, RICHARD LYNEX, of Philadelphia, in the county of Philadelphia and State of Pennsylvania, have invented certain new and useful Improvements in Traps for Rats, &c.; and I do hereby declare the following to be a full, clear, and exact description of the invention, such as will enable others skilled in the art to which it pertains to make and use it, reference being had to the accompanying drawings, which form part of this specification, in which—

Figure 1 is a perspective view of my improved rat-trap, and Fig. 2 is an end view of a modification of the same.

My invention has for its object to provide a trap suitable for and adapted to catching two rats at one and the same time, said trap costing no more, and possibly even less, to construct than the common trap heretofore made and adapted to catching but a single rat at one time.

My invention has for its further object to provide means for setting the bait-hook more readily and efficiently than has been possible with the methods heretofore generally adopted.

My improvements consist in the peculiar construction and combination of parts hereinafter set forth, having reference, particularly, first, to forming the body of the trap in the shape of an open or doorless tunnel, provided with two bait-hooks, approachable, respectively, from opposite ends of the trap, and two spring-levers, one for each bait-hook, so constructed as that when said hooks are disturbed by the rats nibbling at the bait said levers will be released and sprung down with such force as to break the back of and instantly kill the rodents.

My improvements further relate to the bait-hook; and consist in so constructing the same that it will engage directly with the spring-lever, as hereinafter fully set forth.

Referring to the accompanying drawings, A indicates a skeleton tunnel of wire rods, the bottom being of the same material as the top and sides, as shown in Fig. 1; or, if preferred, a wooden or solid bottom, as shown at B in Fig. 2, may be used.

Said tunnel has open or doorless ends $a$ $a'$, and near its middle has two pairs of uprights, $b$ $b'$, each pair having a straight cross-piece, $c$ $c'$, near the roof, and a V-shaped keeper, $d$ $d'$. E E' are the bait-hooks, composed of rods formed with loops $e$ $e^1$, by means of which they are swung on the cross-pieces $c$ $c'$. They have also hooked ends $e^2$ $e^3$, their opposite extremities being bent at $e^4$ $e^5$ $e^6$ $e^7$, and terminating in eyes $e^8$ $e^9$. F F' are the spring-levers, each of which consists of a rod bent to form a bow, $f$ $f^1$, and reversely-coiled springs $f^2$ $f^3$ $f^4$ $f^5$, the ends of each lever being fastened, as shown, to cross-rods G G', or in any other suitable manner. The arrangement of the springs just described is such as to cause the levers to have a tendency to spring downwardly.

To "set" the trap the bait is first placed on the hooks $e^2$ $e^3$. The levers F F' are then raised and brought into engagement with the bait-hooks, as shown, the eyes $e^8$ $e^9$ of said hooks coming down over or in advance of said levers and retaining the latter in their raised position, the keepers $d$ $d'$ governing the limit of movement of said bait-hooks. The trap A, now set, forms an open tunnel, and hence is less deterring to the instinct of a rodent than is a close cage having but a single opening. In other words, a rat approaching the trap can see through it without observing any obstruction to his passage or egress, and hence will be less afraid of entering than he would be where no outlet is visible save the opening through which he enters, as in traps or cages as commonly constructed.

Entering the trap at either end, the rat approaches the bait and begins to nibble thereat. Instantly the lever under which he is standing is released, and, descending with great force, breaks his back and extinguishes his life. The lifeless body is retained fast by the sprung bow, while the other lever, if as yet undisturbed, remains set until its corresponding bait-hook is unsettled by nibbling, when another rodent meets his fate in the manner already described.

Two rats are thus caught in the one device, the catching or retention of one in no wise disturbing the inducement and apprehension of the other, and the contrivance, owing to the absence of doors or dividing-partitions, retaining always the appearance of an open tunnel, whether one or both levers are set or sprung, and, by reason of the same absence of doors or partitions, costing no more, and possibly even less, to construct than an ordinary wire cage adapted to catching but a single rat at a time.

What I claim as my invention is—

1. A trap for rats, &c., consisting of an open or doorless tunnel, having two bait-hooks and two spring-actuated levers or loops, substantially as shown and described.

2. The bait-hook E, having a loop, $e$, hook $e^2$, and eye $e^3$, in combination with uprights $b$, cross-piece $c$, keeper $d$, and spring-lever F, and arranged to engage directly with the latter, substantially as shown and described.

In testimony that I claim the foregoing I have hereunto set my hand this 17th day of January, 1879.

RICHARD LYNEX.

Witnesses:
 M. D. CONNOLLY,
 S. J. VAN STAVOREN.